(No Model.)
A. B. CLARK.
BICYCLE.
No. 579,042. Patented Mar. 16, 1897.
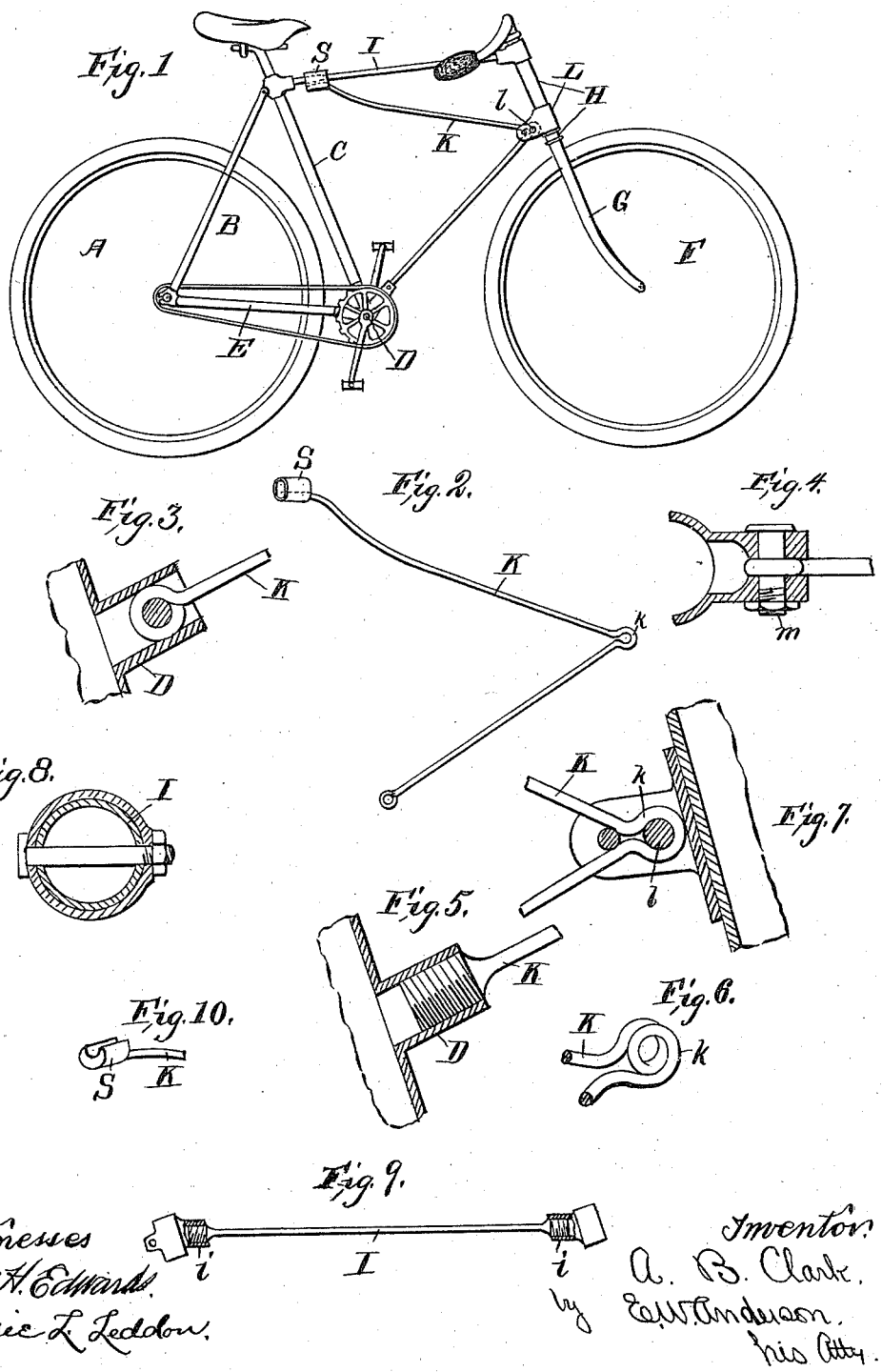
Witnesses
Wm. H. Edwards
Jessie L. Leddon
Inventor
A. B. Clark
by E. W. Anderson
his Atty.

UNITED STATES PATENT OFFICE.

ALVIN B. CLARK, OF RICHMOND, INDIANA.

BICYCLE.

SPECIFICATION forming part of Letters Patent No. 579,042, dated March 16, 1897.

Application filed August 8, 1896. Serial No. 602,148. (No model.)

*To all whom it may concern:*

Be it known that I, ALVIN B. CLARK, a citizen of the United States, and a resident of Richmond, in the county of Wayne and State of Indiana, have invented certain new and useful Improvements in Bicycles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view of a bicycle having the invention applied thereto. Fig. 2 is a detail view of the spring K. Figs. 3, 4, and 5 are detail views showing how the spring K may be connected to the crank-shaft bearing. Fig. 6 is a detail of the apex portion of said spring. Fig. 7 is a view showing the connection for the same. Figs. 8 and 9 are detail views showing means for connecting the bar I in the frame, and Fig. 10 is a detail view of a modified form of the connection between the bar I and the spring K.

This invention is designed to provide an elastic cushion or frame of improved character for bicycles; and it consists in the novel construction and combination of parts, all as hereinafter described, and pointed out in the appended claims.

Referring to the accompanying drawings, the letter A designates the rear wheel of a bicycle, B the rear fork, C the seat-post, D the crank-shaft and its bearing, E the rods which extend from said bearing to the rear axle, F the front wheel, G the front fork, and H the steering-head, all of which parts are of substantially the usual construction.

I is the bar or brace which connects the fork-bearing tube with the seat-post and which instead of being rigid, as usual, is made with sufficient inherent elasticity to enable it to yield in a vertical plane to the movements of the front wheel.

K designates a V-shaped spring which is interposed between the fork-bearing tube, the bar I, and the crank-shaft bearing in the manner shown and which constitutes an elastic-brace connection therefor. The apex of said spring is formed with a coil or loop *k*, through which is passed a pin *l* of a block L, which is clamped to the said fork-bearing tube, said block being recessed to admit said loop. The rear end of the lower arm of the spring is connected to the hub of the crank-shaft bearing either rigidly, as shown in Fig. 5, or by a joint *m*, as in Figs. 3 and 4.

The rear end of the upper arm of the spring has a sliding bearing on the rod or bar I, which may consist of a sleeve S, which embraces said rod or bar, as shown in Fig. 1, or a concave bearing-block T, as shown in Fig. 10.

The bar I is preferably made detachable. To this end it may be provided with right and left threaded end portions *i*, which engage corresponding threaded sockets *i*, as indicated in Fig. 9, or its ends may be secured by pins or by bolts and nuts, as indicated in Fig. 8.

It will be observed that in a frame constructed as above described the motion of the front wheel in striking or passing over any resisting object is taken up by bar I and spring K; also, that the seat-post, with the rear portion of the frame, is made capable of a vertical movement with respect to the front wheel and the steering-head, the distance from the seat to the pedals remaining the same. To some extent also the action of the spring, or, more properly, its reaction, after encountering an obstruction, assists the propulsion of the bicycle and lessens the retardation due to such obstruction.

Having thus described my invention, what I claim as new, and desire to secure by Letters Patent, is—

1. In a bicycle, the frame having an elastic upper connection between the front-fork-bearing tube and the seat-post, and an approximately V-shaped spring, the apex of which has a bearing on said front tube, one arm of said spring having a sliding bearing on said upper connection, and the other arm a connection with the saddle-post, substantially as specified.

2. In a bicycle, the combination with the seat-post, and the front-fork-bearing tube, of the elastic upper bar I connecting said tube, and post, and the approximately V-shaped spring whose apex is formed into a loop or coil which has a bearing on said front tube, and whose arms extend, one upwardly and rearwardly to the rear portion of the bar I, which it slidingly engages, and the other downwardly and rearwardly to the crank-shaft bearing to which it is jointed, substantially as specified.

In testimony whereof I affix my signature in presence of two witnesses.

ALVIN B. CLARK.

Witnesses:
ALFRED MEDEARRI,
EVERETT A. RICHEY.